United States Patent
Kim et al.

(10) Patent No.: US 8,153,306 B2
(45) Date of Patent: Apr. 10, 2012

(54) ORGANIC ELECTROLYTE FOR LITHIUM-ION BATTERY AND LITHIUM-ION BATTERY COMPRISING THE SAME

(75) Inventors: Jung Gu Kim, Gyeonggi-do (KR); Eun Gi Shim, Gyeonggi-do (KR); Tae Heum Nam, Gyeonggi-do (KR)

(73) Assignee: Sungkyunkwan University Foundation for Corporate Collaboration, Gyeonggi-do (KR)

( * ) Notice: Subject to any disclaimer, the term of this patent is extended or adjusted under 35 U.S.C. 154(b) by 690 days.

(21) Appl. No.: 12/299,862

(22) PCT Filed: Jun. 10, 2008

(86) PCT No.: PCT/KR2008/003226
§ 371 (c)(1),
(2), (4) Date: Nov. 6, 2008

(87) PCT Pub. No.: WO2008/156255
PCT Pub. Date: Dec. 24, 2008

(65) Prior Publication Data
US 2010/0173186 A1   Jul. 8, 2010

(30) Foreign Application Priority Data
Jun. 21, 2007 (KR) .................. 10-2007-0060965

(51) Int. Cl.
*H01M 6/18* (2006.01)
(52) U.S. Cl. ........ 429/307; 429/314; 429/341; 429/323; 429/330; 429/231.3; 429/231.1; 429/231.5; 429/221; 429/231.8; 429/249; 429/129
(58) Field of Classification Search .................. 429/307, 429/314, 341, 323, 330, 231.3, 231.1, 231.5, 429/221, 231.8, 249, 129
See application file for complete search history.

(56) References Cited

U.S. PATENT DOCUMENTS
6,168,885 B1   1/2001   Narang et al.

FOREIGN PATENT DOCUMENTS
| JP | 09-223516 | 8/1997 |
|----|-----------|--------|
| JP | 10247517 A | 9/1998 |
| KR | 100586947 | 5/2006 |
| KR | 100693288 | 3/2007 |
| WO | WO2005109562 A1 | 11/2005 |

OTHER PUBLICATIONS

Shim et al. "Diphenyloctyl phosphate as a flame-retardant additive in electrolyte for Li-ion batteries"; Journal of Power Sources (available online Sep. 6, 2007), 175(1), pp. 533-539.*
Nam et al. "Diphenyloctyl phosphate and tris(2,2,2-trifluoroethyl) phosphite as flame-retardant additives for Li-ion cell electrolytes at elevated temperature"; Journal of Power Sources (available online Feb. 7, 2008), 180(1), pp. 561-567.*
Official Search Report of the Patent Cooperation Treaty in counterpart foreign Application No. PCT/KR2008/003226 filed Jun. 10, 2008.

* cited by examiner

*Primary Examiner* — Laura Weiner
(74) *Attorney, Agent, or Firm* — Kinney & Lange, P.A.

(57) ABSTRACT

Disclosed are an organic electrolyte for a lithium-ion battery and a lithium-ion battery comprising the same, wherein the electrolyte includes a base electrolyte containing a lithium salt dissolved in an organic solvent, and diphenyloctyl phosphate added thereto in an amount of 0.1 to 20 wt %. As compared to a conventional organic electrolyte using only a carbonate ester-based solvent, such as ethylene carbonate, ethyl methyl carbonate, etc., the lithium-ion battery employing the organic electrolyte can improve thermal stability of an electrolyte solution, high-rate performance, and charge/discharge cyclability of a battery, while maintaining battery performance of the base electrolyte.

9 Claims, 5 Drawing Sheets

ORGANIC ELECTROLYTE FOR LITHIUM-ION BATTERY AND LITHIUM-ION BATTERY COMPRISING THE SAME

TECHNICAL FIELD

The present invention relates to an organic electrolyte for a lithium-ion battery and a lithium-ion battery including the same. More particularly, the present invention relates to an organic electrolyte for a lithium-ion battery, which comprises a base electrolyte containing a lithium salt dissolved in an organic solvent, and diphenyloctyl phosphate added thereto, thereby improving thermal stability of an electrolyte solution, high-rate performance of a battery, and charge/discharge cyclability, and to a lithium-ion battery comprising the same.

BACKGROUND ART

Recently, as an electronic device has been made more miniaturized, lightened, slimmed, and portable with the development of the information communication industry, a battery used as an electric source for such an electronic device has been strongly required to have a high energy density. Accordingly, a lithium-ion battery, which is the most satisfying battery for such requirement, has been actively researched.

A lithium-ion battery generally has a drive voltage of 3.6V or more (which is higher than approximately three times that of a Ni—Cd battery or a Ni-MH battery), high energy density and an excellent lifetime characteristic, and thus the market related to the lithium-ion battery has rapidly grown. At present, the lithium-ion battery is widely used for portable electronic devices, etc., such as mobile phones, notebook computers, digital cameras, camcorders, etc., and also research on application of a high capacity lithium-ion battery to electric vehicles, hybrid electric vehicles, robotics, aerospace, etc. is actively being conducted.

The lithium-ion battery comprises a cathode comprising a metal oxide containing lithium, an anode comprising a carbonaceous material capable of lithium intercalation/deintercalation, an electrolyte providing a movement path of lithium ions, and a separator interrupting short circuit in the cathode and the anode, and generates electrical energy by oxidation/reduction reactions through intercalation/deintercalation of the lithium ions at the cathode and the anode. Such a lithium-ion battery requires an electrolyte having an electrochemically improved composition so as to achieve a high drive voltage, a low self-discharge rate, high energy density, long cycle life, etc. As such an electrolyte, a non-aqueous mixed solvent including a combination of carbonate-based solvents, such as PC (Propylene Carbonate), EC (Ethylene Carbonate), DEC (Diethyl Carbonate), DMC (Dimethyl Carbonate), EMC (Ethylmethyl Carbonate), is mainly used.

The properties of an organic electrolyte are indicated by main indicators, such as conductivity, electrochemical stability window, operating temperature range, density and stability. In particular, indicators related to the conductivity include solubility, degree of dissociation, permittivity, viscosity, etc. Each of the solvents used as an electrolyte in a lithium-ion battery has its own advantageous/disadvantageous properties, and, thus, battery performance is largely dependent on a combination of such properties of the employed solvents. As described above, a lithium-ion battery mainly uses a non-aqueous organic electrolyte. The non-aqueous electrolyte is widely used despite low conductivity because its electrochemical stability window is wider than that of water, and, thus, it is possible to achieve high voltage of a battery.

In such a lithium-ion battery, one of the biggest problems is low stability. During a formation reaction of a solid electrolyte interface (SEI) film, gas is generated within the battery by decomposition of a carbonate based organic solvent. The generated gas within the battery causes sudden reactions, such as expansion of battery thickness upon charge, decomposition of the organic solvent with the passage of time during high-temperature storage upon overcharge or after charge, etc. Such decomposition of an organic solvent causes stability degradation, such as battery performance deterioration, and fire and explosion of a battery.

Since trimethyl phosphate (TMP) and triethyl phosphate (TEP) (flame retardants for plastic) have been initially applied to a lithium-ion battery, research on a flame retardant, such as tributyl phosphate (TBP), and hexamethoxycyclotriphosphazene (HMPN), has been continuously conducted. However, there is a problem in that such a flame retardant provides a flame retardant effect while causing battery performance deterioration, such as reduction of charge/discharge cycle life, by ion conductivity of an electrolyte, reversible deterioration of a battery, etc.

In order to solve such a problem, technology of additioning a certain compound to an electrolyte has been developed.

For example, Korean Patent Publication No. 10-0693288 disclosed a method of improving the stability of a battery by adding a mixture of naphtoyl chloride, divinyl adipate, and ethoxy ethyl phosphate, thus suppressing overcharge of the battery. Also Korean Patent Publication No. 10-0585947 disclosed a method of improving battery performance at high C-rate by adding a mixture of trimethylsilyl borate and trimethylsilyl phosphate.

However, in the case of an electrolyte including the above mentioned additives, some effects, such as overcharge suppression or performance improvement at high C-rate, have been known, but other effects of battery performance have not been specifically known. Also when a certain compound is added in an electrolyte in order to improve battery performance, some areas of the battery performance are expected to be improved while other areas may be degraded.

Therefore, an electrolyte, which is not adversely affecting battery performance and at the same time can show a flame retardant effect, has been required to be developed.

SUMMARY

Technical Problem

Therefore, the present invention has been made in view of the above-mentioned problems. The present invention provides an organic electrolyte for a lithium-ion battery, which comprises a base electrolyte containing an organic solvent and a lithium salt, and a flame retardant additive thereby improving thermal stability of the organic electrolyte and battery performance.

Also the present invention provides a lithium-ion battery comprising the electrolyte above.

Technical Solution

In accordance with an aspect of the present invention, there is provided an organic electrolyte and a lithium-ion battery comprising the same, wherein the organic electrolyte comprises a solution containing a lithium salt dissolved in an organic solvent and diphenyloctyl phosphate as a flame retardant additive.

Diphenyloctyl phosphate used in the present invention, a kind of phosphate-based flame retardant, has a boiling point of 225° C. and is a compound which has been mainly used as a flame retardant material of a plastic composite. In such a phosphate-based flame retardant, polymetaphosphate is usually generated by pyrolysis, and a carbon layer formed by dehydration during the generation process of the polymetaphosphate blocks oxygen and latent heat, thereby reducing a pyrolysis reaction. Examples of the phosphate-based flame retardant include phosphates, such as red phosphorous, phosphate such as ammonium phosphate, phosphites, phosphine oxide, phosphine oxide diols, phosphonates, triaryl phosphate, alkyldiaryl phosphate, trialkyl phosphate, resorcinaol bisdiphenyl phosphate (RDP).

The diphenyloctyl phosphate is preferably included in an amount of 0.1 to 20 wt %, based on a base electrolyte. If the content of the diphenyloctyl phosphate is less than 0.1 wt %, it is impossible to prevent thermal runaway caused by overcharge, and if the content of the diphenyloctyl phosphate is greater than 20 wt %, the battery performance may be deteriorated. The diphenyloctyl phosphate is added in an organic solvent including a lithium salt. The lithium salt operates as a supply source of lithium ions within a battery, thereby allowing a lithium-ion battery to basically operate, and the organic solvent plays a role of a medium allowing the ions participating in an electrochemical reaction of the battery to move. Herein, the organic solvent used in the present invention has to have high permittivity (polarity) and low viscosity so as to increase ion conductivity by increase of ion dissociation degree.

As the lithium salt, any one compound or a mixture of at least two compounds selected from the group consisting of $LiPF_6$, $LiBF_4$, $LiAsF_6$, $LiClO_4$, $LiCF_3SO_3$, $LiC(SO_2CF_3)_3$, $LiN(CF_3SO_2)_2$, and $LiCH(CF_3SO_2)_2$, may be used. As the lithium salt, a material having high ion conductivity, high thermal stability, and high oxidation resistance due to its low lattice energy and high dissociation degree is preferably used. In the electrolyte, the lithium salt is preferably used in a concentration of 0.6 to 2.0M. If the concentration of the lithium salt is less than 0.6M, the concentration of the electrolyte is low, thereby reducing the performance of the electrolyte. On the other hand, if the concentration of the lithium salt is greater than 2.0M, the viscosity of the electrolyte increases, thereby reducing the mobility of lithium ions and degrading the performance at low temperatures.

In the present invention, as a non-aqueous organic solvent, carbonates, esters, ethers, or ketones may be used. Examples of the carbonate-based solvent may include ethylene carbonate (EC), propylene carbonate (PC), diethyl carbonate (DEC), dimethyl carbonate (DMC), ethyl methyl carbonate (EMC), dipropyl carbonate (DPC), methyl propyl carbonate (MPC), ethyl propyl carbonate (EPC), or buthylene carbonate (BC), etc. Examples of the ester-based solvent may include methyl acetate, ethyl acetate, propyl acetate, etc. Examples of the ether-based solvent may include tetrahydrofuran, or 2-methyltetrahydrofuran, etc., and examples of the ketone-based solvent may include polymethylvinyl ketone.

A lithium-ion battery comprising the electrolyte of the present invention comprises a cathode, an anode, and a separator. The cathode comprises a cathode active material capable of reversibly intercalating/deintercalating lithium ions, and representative examples of such a cathode active material may include $LiCoO_2$, $LiNiO_2$, $LiMnO_2$, $LiMn_2O_4$, $V_2O_5$, or $LiFePO_4$. The anode comprises an anode active material capable of intercalating/deintercalating lithium ions, and examples of such an anode active material may comprise a crystalline/amorphous carbon, a carbon-based anode active material of a carbon composite (pyrolyzed carbon/coke/graphite), carbon fibers, a tin oxide compound, a lithium metal, or a lithium alloy.

The lithium-ion battery may comprise a separator for interrupting a short circuit between the cathode and the anode, and as the separator, a polymer membrane or a multilayered film of polyethylene, polypropylene, polyolefin, a microporous film, woven fabric or non-woven fabric, may be used.

In the electrolyte of the present invention, 1.15M $LiPF_6$ (an electrolyte salt) solution dissolved in a mixed solvent of ethylene carbonate (EC): ethyl methyl carbonate (EMC) (30:70 (v/v)) is used as a base electrolyte, and a diphenyloctyl phosphate additive is added in an amount of 5 wt %, based on the base electrolyte.

In the lithium-ion battery comprising the electrolyte, a cathode is obtained by using $LiCoO_2$ as a cathode active material, PVDF (polyvinylidene difluoride) as a binder, and Super P black as a conductive agent, and an anode is obtained by using MCMB (mesocarbon microbeads) as an anode active material, PVDF as a binder, and Super P black as a conductive agent. The lithium-ion battery is obtained by the steps of: fabricating an electrode assembly by interposing a separator between the cathode and the anode; introducing the fabricated electrode assembly into a casing; and injecting the electrolyte for the lithium-ion battery of the present invention thereto.

Advantageous Effects

As described above, the lithium-ion battery according to the present invention improves the lifetime characteristic of a battery due to improvement of thermal stability of an electrolyte, high-rate performance, and the reduction of battery internal resistance.

DESCRIPTION OF DRAWINGS

The foregoing and other objects, features and advantages of the present invention will become more apparent from the following detailed description when taken in conjunction with the accompanying drawings in which.

DESCRIPTION OF THE MAJOR PARTS OF THE DRAWINGS

Figure 1:
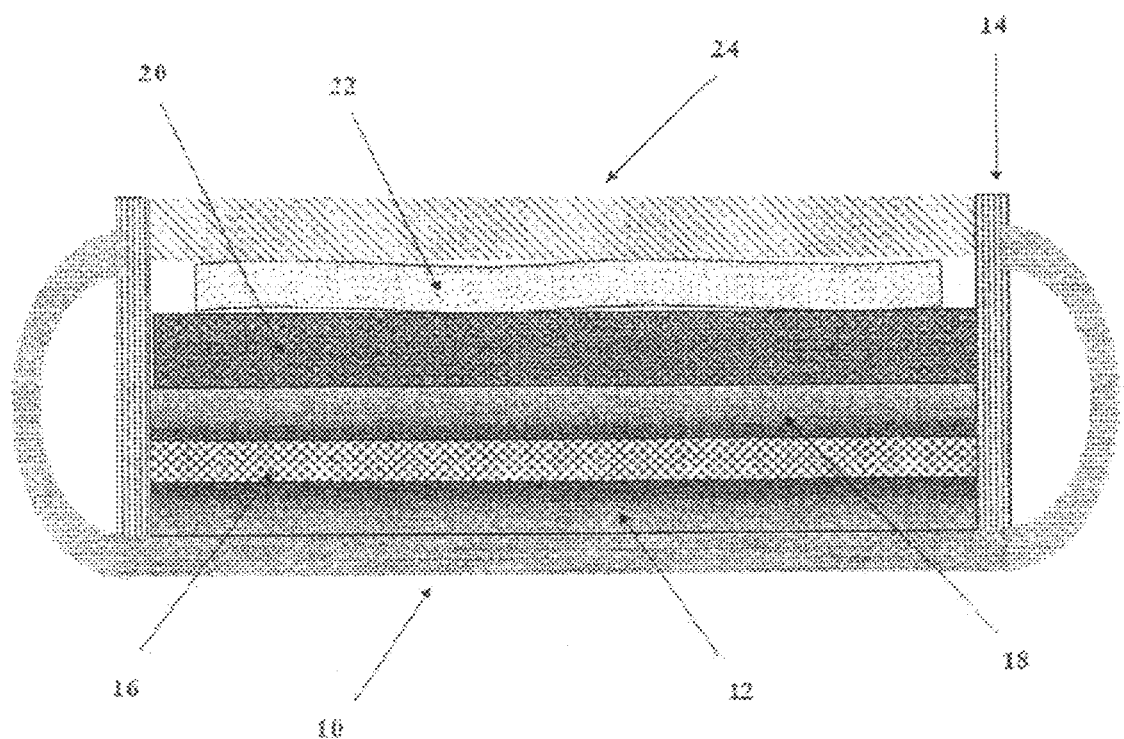
FIG. 1 is a cross-sectional view of a 2032 coin-type cell of the present invention.

10: a stainless steel case
12: an anode
14: an insulating gasket
16: a separator 18: a cathode
20: a spacer
22: a spring
24: a stainless steel cover Mode For Invention Hereinafter, the present invention will be described in detail with reference to Preparation Examples and Examples. However, the following examples are illustrative only and the scope of the present invention is not limited thereto.

PREPARATION EXAMPLE

Preparation Example 1

Preparation of an Electrolyte and a Battery (Preparation of an Electrolyte)

1.15M $LiPF_6$ solution dissolved in a mixed solvent of ethylene carbonate (EC): ethyl methyl carbonate (EMC) (3:7 (v/v)) was used as a base electrolyte to obtain an organic electrolyte.

(Manufacture of a Battery)

A 2032 coin-type cell (diameter of can: 20 mm, height of can: 3.2 mm) was manufactured. As a cathode active material, $LiCoO_2$ was used. The active material: a binder (PVDF, polyvinylidene difluoride): a conductive agent (Super P black) in a weight ratio of 95:2:3 were added in a NMP (n-methyl 2-pyrrolidinone) solvent to obtain slurry. The slurry was applied on aluminum foil, followed by drying at 110° C. for 12 hours and rolling by a roll press, to obtain a cathode 15. As an anode active material, MCMB (mesocarbon microbeads) was used. The active material: a binder (PVDF): a conductive agent (Super P black) in a weight ratio of 95:3:2 were dissolved in an NMP solvent to obtain slurry. The slurry was applied on a copper current collector, followed by drying at 110° C. for 12 hours and rolling by a roll press, to obtain an anode 12. A porous polypropylene separator 16 was interposed between the cathode 18 and the anode 12, and was impregnated with the organic electrolyte. Between the cathode 18 and a stainless steel cover 24, a spacer 20, a spring 22, and an insulating gasket 14 were inserted then, was completely sealed by a stainless steel case 10 and the stainless steel cover 24 to obtain a 2032 coin-type cell (see FIG. 1).

Preparation Example 2

Preparation of an Electrolyte and a Battery

An electrolyte and a battery were obtained in the same manner as described in Preparation Example 1, except that 5 wt % of diphenyloctyl phosphate was used in the organic electrolyte.

Example

Figure 2:
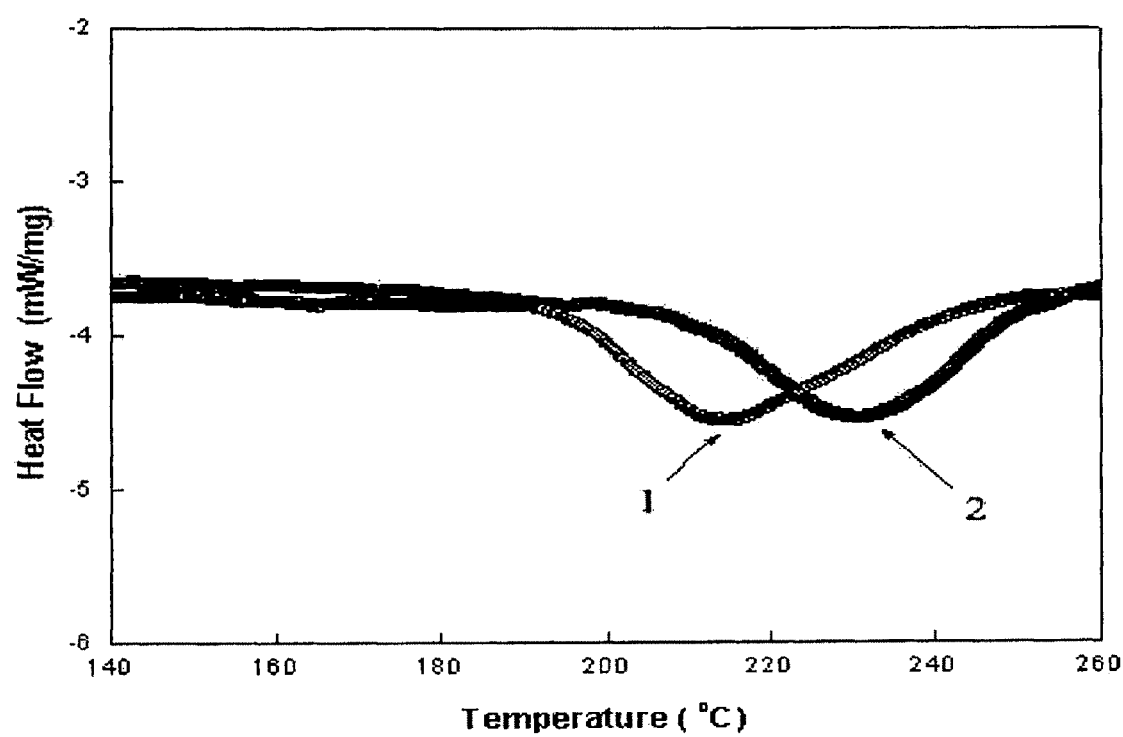
FIG. 2 is a graph showing the results of differential scanning calorimetry (DSC) analysis of organic electrolytes obtained from Preparation Examples 1 and 2 of the present invention.

Thermal analysis of an electrolyte: On each of electrolytes prepared from Preparation Examples 1 and 2, a pyrolysis reaction test was carried out by differential scanning calorimetry (DSC). Table 1 and FIG. 2 show the results. As shown in Table 1 and FIG. 2, Preparation Example 1 including a base electrolyte where diphenyloctyl phosphate was not added as an additive showed an endothermic reaction temperature of an electrolyte of 215° C. and Preparation Example 2 including an electrolyte of the present invention, showed a high reaction temperature of 231° C.

Figure 3:
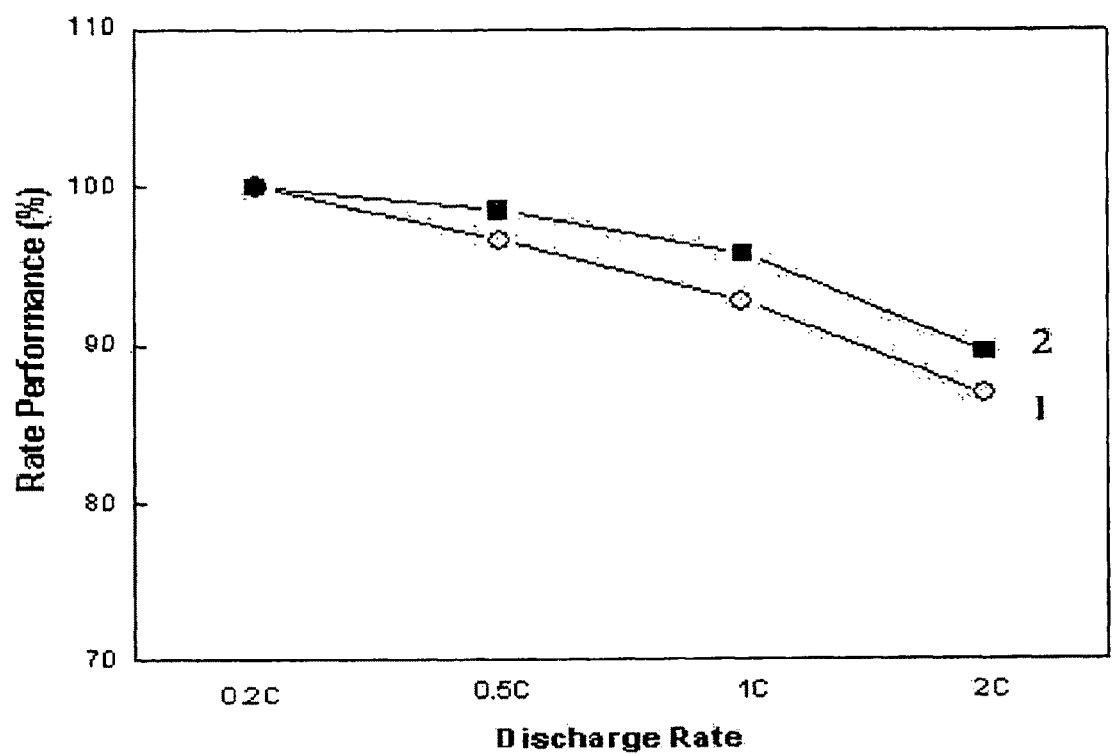
FIG. 3 is a comparison graph showing the discharge capacity at different rates, which was carried out on lithium ion batteries obtained from Preparation Examples 1 and 2 of the present invention.

Rate performance test: On each of the batteries including electrolytes prepared from Preparation Examples 1 and 2, discharge capacity test at different rates was carried out. Table 2 and FIG. 3 show the results. As shown in Table 2 and FIG. 3, the battery obtained from Preparation Example 1 where diphenyloctyl phosphate was not added as an additive showed rate performance of 87% at 2 C, while the battery obtained from Preparation Example 2 where an electrolyte of the present invention was included showed improved rate performance of 90% at 2 C.

Figure 4:
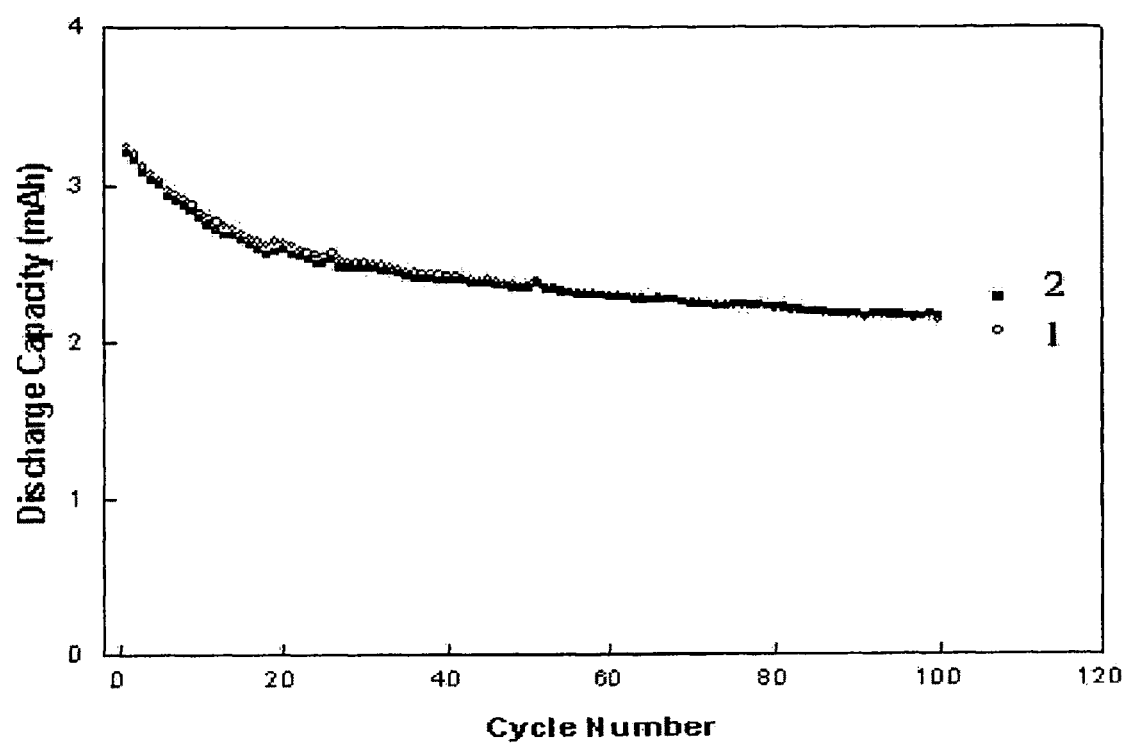
FIG. 4 is a graph showing the results of a charge/discharge cycle test, which was carried out on the lithium ion batteries obtained from Preparation Examples 1 and 2 of the present invention.
Figure 5:
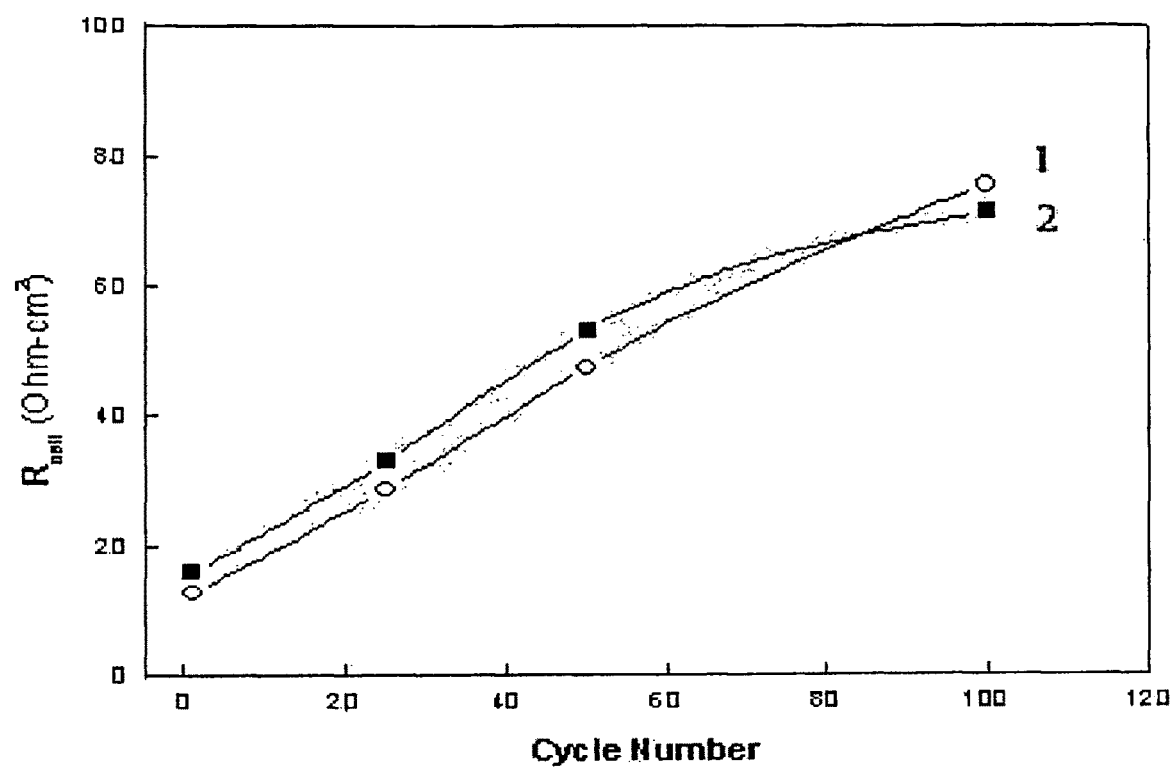
FIG. 5 is a graph showing the results of an electrochemical impedance spectroscopy (EIS) test during the cycle test of the lithium ion batteries obtained from Preparation Examples 1 and 2 of the present invention.

Test on charge/discharge cycles and measurement of internal resistance: In order to test battery cycle-life, a battery was subjected to 100 charge/discharge cycles at 1.0 C (3.0 mA) at room temperature. Accordingly, each battery was subjected to a constant current/constant voltage charge to 4.2V, and was subjected to a constant current discharge to 2.75V. Also during the test of 100 cycles, EIS (electrochemical impedance spectroscopy) measurement was carried out to compare internal resistances of batteries. Table 3 and FIGS. 4 and 5 show the capacity maintenance ratio after 100 cycles and the resistance ($R_{cell}$) during 100 cycles. As shown in Table 3 and FIG. 4, after 100 cycles, the battery obtained from Preparation Example 2 in which an electrolyte of the present invention is included showed a capacity maintenance ratio of 68%, while the battery obtained from Preparation Example 1 showed a capacity maintenance ratio of 66%. Accordingly, it can be seen that the battery obtained from Preparation Example 2 has an improved battery cycle-life characteristic. Also after 100 cycles, the battery comprising diphenyloctyl phosphate as an additive showed higher discharge capacity, compared to the battery not comprising the additive. As shown in Table 3 and FIG. 5, this is because after 100 cycles, Preparation Example 2 has an internal resistance ($R_{cell}$) of 71.2 $\Omega m^2$, which is lower than that (75.5 $\Omega m^2$) of Preparation Example 1.

As shown in Tables 1, 2 and 3, and graphs of FIGS. 2, 3, 4, and 5, it can be seen that the use of the electrolyte according to the present invention improves thermal stability of the electrolyte, rate performance test of a battery, and cycle-life of the battery.

TABLE 1

| Preparation Example | Electrolyte | Additive | Reaction temperature (° C.) |
|---|---|---|---|
| Preparation Exp. 1 | 1.15 M $LiPF_6$/EC:EMC (3:7 v/v) | | 215 |
| Preparation Exp. 2 | 1.15 M $LiPF_6$/EC:EMC (3:7v/v) | DPOF 5 wt % | 231 |

TABLE 2

| | | Rate Performance (%) | |
|---|---|---|---|
| Current rate | Current drain (mA) | Preparation Exp. 1 | Preparation Exp. 2 |
| 0.2 C | 0.6 | 100 | 100 |
| 0.5 C | 1.5 | 97 | 99 |
| 1.0 C | 3.0 | 93 | 96 |
| 2.0 C | 6.0 | 87 | 90 |

TABLE 3

| Preparation Exp | Capacity maintenance ratio after 100 cycles (%) | internal resistance $R_{cell}/(\Omega \cdot cm^2)$ | | | |
|---|---|---|---|---|---|
| | | 1 cycle | 25 cycles | 50 cycles | 100 cycles |
| 1 | 66 | 12.7 | 28.7 | 47.4 | 75.5 |
| 2 | 68 | 15.8 | 33.1 | 53.0 | 71.2 |

Industrial Applicability

Although several exemplary embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. An electrolyte for a lithium-ion battery, comprising: a lithium salt and an organic solvent, wherein the electrolyte comprises diphenyloctyl phosphate.

2. The electrolyte of claim 1, which comprises the diphenyloctyl phosphate in an amount of 0.1 to 20 wt % based on weight of the electrolyte.

3. The electrolyte of claim 1, wherein the electrolyte comprises one lithium salt or a mixture of at least two lithium salts selected from the group consisting of $LiPF_6$, $LiBF_4$, $LiAsF_6$, $LiClO_4$, $LiCF_3SO_3$, $LiC(SO_2CF_3)_3$, $LiN(CF_3SO_2)_2$, $LiCH(CF_3SO_2)_2$.

4. The electrolyte of claim 1, wherein the electrolyte comprises one solvent or a mixture of at least two organic solvents selected from the group consisting of a carbonate-based solvent, an ester-based solvent, an ether-based solvent, and a ketone-based solvent.

5. The electrolyte of claim 3, wherein the electrolyte comprises one solvent or a mixture of at least two organic solvents selected from the group consisting of a carbonate-based solvent, an ester-based solvent, an ether-based solvent, and a ketone-based solvent.

6. A lithium-ion battery comprising:
a cathode comprising a cathode active material capable of reversibly intercalating/deintercalating battery lithium ions;
an anode comprising an anode active material capable of reversibly intercalating/deintercalating the battery lithium ions;
a separator interposed between the cathode and the anode, which interrupts short circuit; and
the electrolyte of claim 1.

7. The lithium-ion battery of claim 6, wherein the cathode comprises the cathode active material selected from the group consisting of $LiCoO_2$, $LiNiO_2$, $LiMnO_2$, $LiMn_2O_4$, $V_2O_5$, and $LiFePO_4$.

8. The lithium-ion battery of claim 6, wherein the anode comprises the anode active material selected from the group consisting of crystalline/amorphous carbon, a carbon-based anode active material of a carbon composite, carbon fibers, a tin oxide compound, a lithium metal, and a lithium alloy.

9. The lithium-ion battery of claim 6, wherein the separator is selected from the group consisting of a polymer membrane or a multilayered film of polyethylene, polypropylene, or polyolefin, a microporous film, woven fabric, and non-woven fabric.

* * * * *